United States Patent
Acharya

(10) Patent No.: US 8,800,413 B2
(45) Date of Patent: Aug. 12, 2014

(54) CUTTING UNIT, METHOD OF VARYING RAKE ANGLE OF CUTTING UNIT AND METHOD OF ASSEMBLING THEREOF

(75) Inventor: Gurucharan Acharya, Karnataka (IN)

(73) Assignee: Kennametal Inc., Latrobe, PA (US)

( * ) Notice: Subject to any disclaimer, the term of this patent is extended or adjusted under 35 U.S.C. 154(b) by 30 days.

(21) Appl. No.: 13/432,608

(22) Filed: Mar. 28, 2012

(65) Prior Publication Data
US 2012/0251252 A1 Oct. 4, 2012

(30) Foreign Application Priority Data

Mar. 29, 2011 (IN) .......................... 00994/CHE/2011

(51) Int. Cl.
*B23B 29/04* (2006.01)
*B23B 27/16* (2006.01)

(52) U.S. Cl.
CPC ....... *B23B 27/1685* (2013.01); *B23B 2260/124* (2013.01); *B23B 2265/36* (2013.01)
USPC .................. 82/1.11; 407/76; 407/83; 407/89; 407/90

(58) Field of Classification Search
USPC ........... 407/73, 75, 76, 79, 81, 83, 84, 88, 89, 407/90, 46, 36
See application file for complete search history.

(56) References Cited

U.S. PATENT DOCUMENTS

| | | | | |
|---|---|---|---|---|
| 3,885,282 A | * | 5/1975 | Pataky | 407/89 |
| 4,311,418 A | * | 1/1982 | Erkfritz et al. | 407/39 |
| 4,848,977 A | * | 7/1989 | Kieninger | 407/39 |
| 4,927,301 A | * | 5/1990 | Reiterman | 408/180 |
| 5,123,787 A | * | 6/1992 | Hunt | 407/39 |
| 5,853,271 A | * | 12/1998 | Schanz | 408/146 |
| 5,913,643 A | * | 6/1999 | Fowler et al. | 407/36 |
| 8,109,699 B2 | * | 2/2012 | Chen | 407/46 |
| 2007/0280790 A1 | * | 12/2007 | Kovac | 407/30 |
| 2009/0263198 A1 | * | 10/2009 | Matheis | 407/73 |

* cited by examiner

*Primary Examiner* — Andrea Wellington
*Assistant Examiner* — Nicole N Ramos
(74) *Attorney, Agent, or Firm* — Larry R. Meenan, Esq.

(57) ABSTRACT

A cutting unit includes a detachable head assembly with a cutting insert and holder. The mating spherical surfaces in both parts helps to get freedom of movement, hence helps in getting different rake angles. A set of pins helps getting correct center height for the cutting insert when spherical surfaces of both parts are not in contact with each other. The pins when lifted up gives point contact with spherical surface of the head assembly. The pins are moved in the holes provided in the holder with the help of screw-nut principle. The head assembly is clamped against holder using a clamping ball mechanism. The clamping balls are free to rotate in their respective seating area. Rake angles are changed by turning the head assembly manually. Once the required rake is set, the clamping balls are fastened.

7 Claims, 7 Drawing Sheets

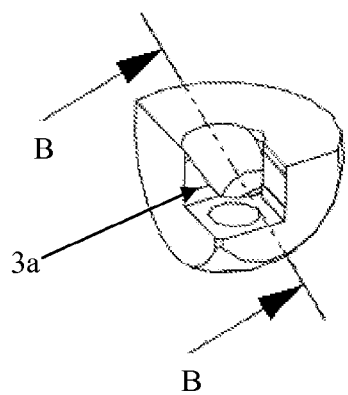
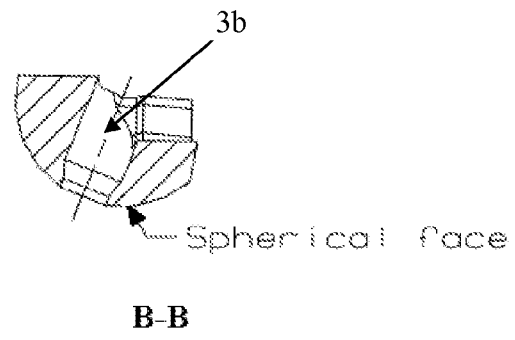
FIG. 4a                    FIG. 4b
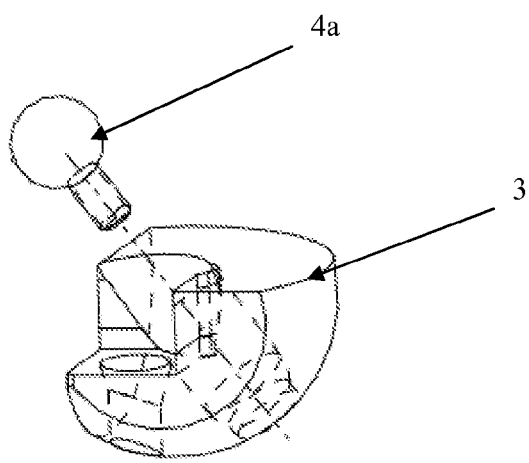
FIG. 5

CUTTING UNIT, METHOD OF VARYING RAKE ANGLE OF CUTTING UNIT AND METHOD OF ASSEMBLING THEREOF

CLAIM TO PRIORITY

This application is a National entry application of Indian Application No. 00994/CHE/2001, filed Mar. 29, 2011, the entire contents of which is incorporated herein by reference.

FIELD OF THE INVENTION

The disclosure relates to a cutting unit, more specifically relates to variable rake cutting unit, comprising detachable head assembly with a cutting inert and holder.

BACKGROUND OF THE INVENTION

In the existing cutting units, the option for changing approach angle and rake angle is not provided. In regular cutting units, once the rake angles and the approach angle of the cutting insert is set, it cannot be altered for future purposes. Thus for the different rake angles and the approach angles, the whole new cutting unit has to be used which increases the operating cost during manufacturing process.

SUMMARY OF THE INVENTION

Accordingly, the disclosure provides for a cutting unit (1) comprising a holder (2) comprising a supporting block (2a) including a cut out (2b) at one end in one face; and a plurality of through holes (2d, 3b) at predetermined places on the cut out (2b); a head assembly (3) connected to said block (2a), conforming to shape of said cut out, said head assembly (3) comprising an insert pocket (3a) to accommodate a cutting insert (6), and a through hole (3b) at its center for connecting with the holder (2); a fastening means (4) passing through the holes (2d) of the supporting block (2a) and head assembly (3); and a plurality of pins (5) passing through the holes (2c) of the holder (2), wherein said pins (5) are varied to displace the head assembly (3) to vary rake angle of the cutting unit (1), also provides for a method of varying rake angle of cutting unit (1), said method comprising acts of varying lengths of pins (5) passing through the threaded holes (2c) to a predetermined length; and clamping fastening means (4) to set rake angle of the cutting unit (1), and also provides for a method of assembling a cutting unit (1) comprising mounting a cutting insert (6) onto an insert pocket (3a) of a head assembly (3); mounting the head assembly (3) onto a supporting block (2a) of a holder (2) at one end in one face; connecting the head assembly (3) to the supporting block (2a) using a fastening means (4) passing through hole (2d) of the supporting block (2a); and passing a plurality of pins (5) through holes (2c) of the holder (2).

BRIEF DESCRIPTION OF THE DRAWINGS

The features of the present disclosure will become more fully apparent from the following description and appended claims, taken in conjunction with the accompanying drawings. Understanding that these drawings depict only several embodiments in accordance with the disclosure and are therefore not to be considered limiting of its scope; the disclosure will be described with additional specificity and detail through use of the accompanying drawings.

FIG. 4a shows perspective view of the head assembly showing the hole at the bottom according to the disclosure.

FIG. 4b shows sectional view of the head assembly showing the hole at the bottom according to the disclosure.

FIG. 5 shows perspective view of the head assembly showing the spherical clamping ball seating area according to the disclosure.

DETAILED DESCRIPTION OF THE INVENTION

Figure 1:
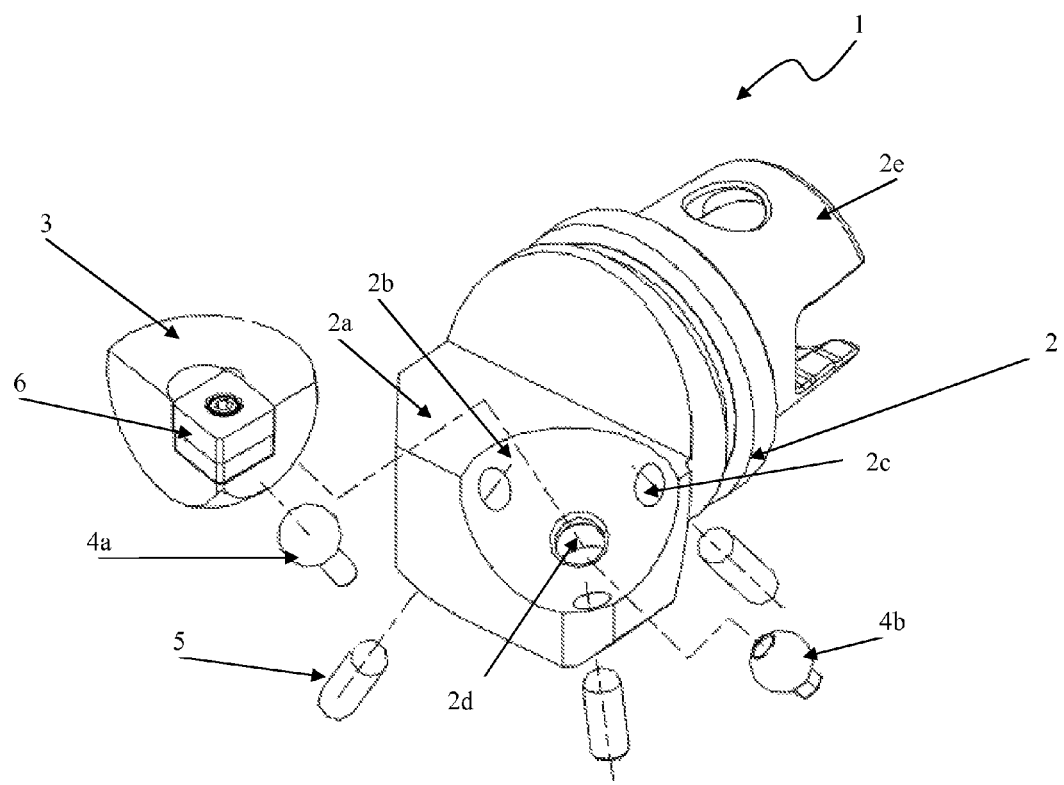
FIG. 1 shows an exploded view of the cutting unit according to the disclosure.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is drawn inter alia to a cutting unit, a method of varying rake angle and a method of assembling the cutting unit.

Referral Numerals
1: Cutting unit,
2: Holder,
2a: Supporting block,
2b: Cut out,
2c: Holes for pins,
2d: Hole on the holder,
2e: Connecting means,
3: Head assembly,
3a: Insert pocket,
3b: Through hole,
4: Fastening means,
4a: Ball bolt,
4b: Ball screw,
5: Pins,
5a: Hexagonal slot,
6: Cutting insert, and
7: Pocket pin.

The disclosure is in relation to a cutting unit (1) comprising a holder (2) comprising a supporting block (2a) including a cut out (2b) at one end in one face; and a plurality of through holes (2d, 3b) at predetermined places on the cut out (2b); a head assembly (3) connected to said block (2a), conforming to shape of said cut out, said head assembly (3) comprising an insert pocket (3a) to accommodate a cutting insert (6), and a through hole (3b) at its center for connecting with the holder (2); a fastening means (4) passing through the hole (2d) of the supporting block (2a) and head assembly (3); and a plurality of pins (5) passing through the holes (2c) of the holder (2), wherein said pins (5) are varied to displace the head assembly (3) to vary rake angle of the cutting unit (1).

In one embodiment, the fastening means (4) comprises a ball bolt (4a) comprising threaded rod connected with a ball screw (4b) comprising a threaded ball head and a hexagonal protrusion for fastening.

In one embodiment, the supporting block (2a) comprises one or more threaded holes (2c) for guiding the pins (5) and wherein axes of the pins (5) meet at one point.

In one embodiment, the pins (5) are threaded for predetermined length and have spherical face at an end contacting the head assembly (3) and have hexagon slot (5a) at bottom to provide movement inside the threaded holes (2c).

In one embodiment, the cut out (2b) is in shape of segment of a sphere.

In one embodiment, the hole (3b) in the head assembly (3) is fitted with a pocket pin (7) for filling a gap created on the head assembly (3) by the hole (3b) and to support the cutting insert (6).

The disclosure is in relation to a method of varying rake angle of cutting unit (1), said method comprising acts of varying lengths of pins (5) passing through the threaded holes (2c) to a predetermined length; and clamping fastening means (4) to set rake angle of the cutting unit (1).

In one embodiment, the pins (5) make point contact with spherical bottom surface of head assembly (3) to vary the rake angle of the cutting unit (1).

The disclosure is in relation to a method of assembling a cutting unit (1) comprising mounting a cutting insert (6) onto an insert pocket (3a) of a head assembly (3); mounting the head assembly (3) onto a supporting block (2a) of a holder (2) at one end in one face; connecting the head assembly (3) to the supporting block (2a) using a fastening means (4) passing through hole (2d) of the supporting block (2a); and passing a plurality of pins (5) through holes (2c) of the holder (2).

In one embodiment, a pocket pin (7) is fitted at hole (3b) of the head assembly (3) by predetermined process.

FIG. 1 illustrates the exploded view of the cutting unit (1) according to the disclosure. The cutting unit (1) comprises a holder (2) and a head assembly (3). The holder (2) comprises a spherical base at its operating end and the head assembly (3) consists of cutting insert (6), shim or pocket pin (7) and insert screw mounted on the spherical contour of the holder (2). This spherical contour in the holder (2) consist three pin holes (2c) and a center hole (2d). The head assembly (3) is capable of moving freely to get desired rake angle and approach angle. The pins (5) helps in getting the correct center height for the cutting insert (6) when the rake angle is changed. The pins (5) are guided through the holes (2c) provided in the holder (2) based on screw and nut principle.

Figure 2:
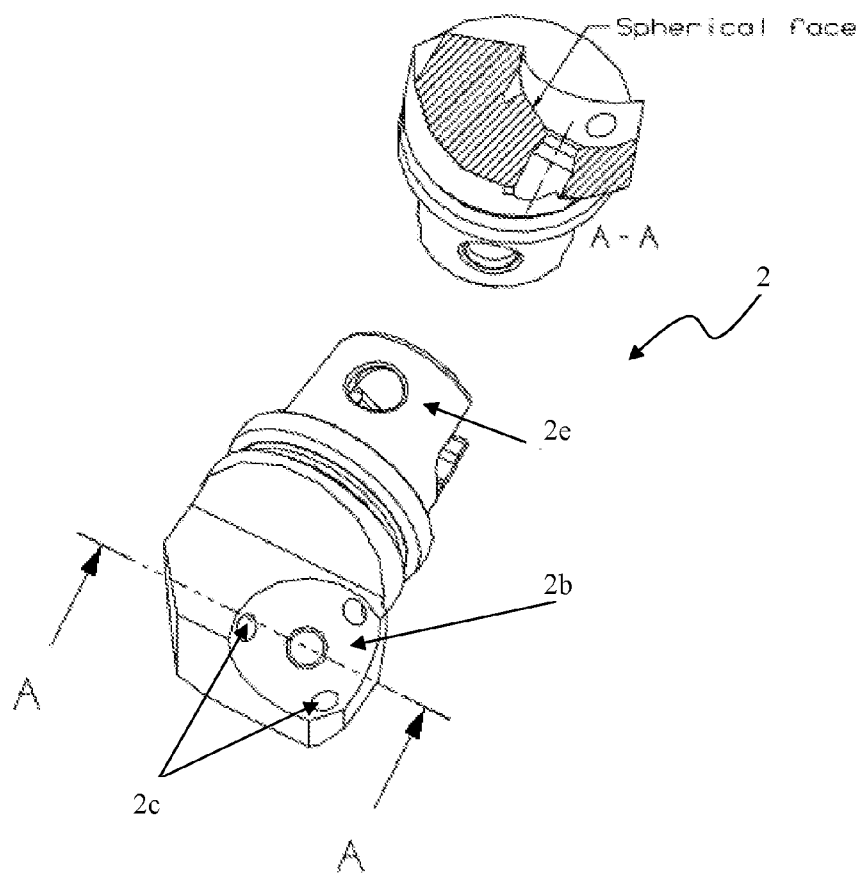
FIG. 2 shows sectional view of spherical cutout in the holder according to the disclosure.

FIG. 2 illustrates a sectional view of spherical cutout (2b) in the holder (2) according to the disclosure. A section of the holder (2) along axis A-A is taken to depict the spherical cutout (2b) of the holder (2). The contour of the cutout (2b) matches with contour of base of the head assembly (3).

Figure 3:
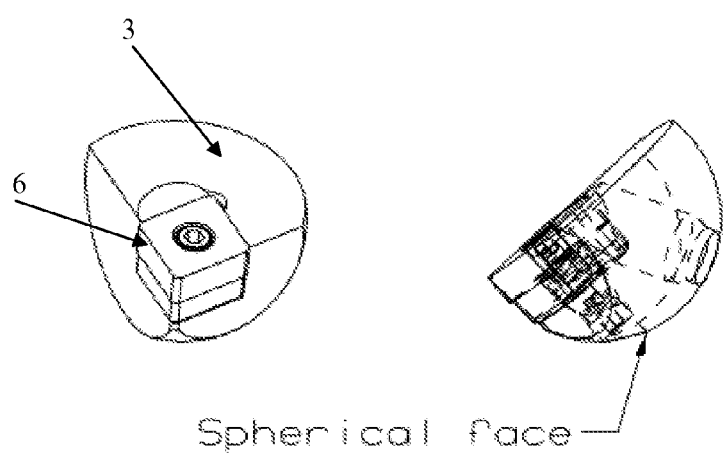
FIG. 3 shows various views of the head assembly mounted with a cutting insert according to the disclosure.

FIG. 3 illustrates perspective and side views of the head assembly (3) mounted with a cutting insert (6) at the insert pocket (3a). The side view clearly depicts the spherical bottom surface which is similar to that of the spherical cutout (2b) of the holder (2).

Figure 6:
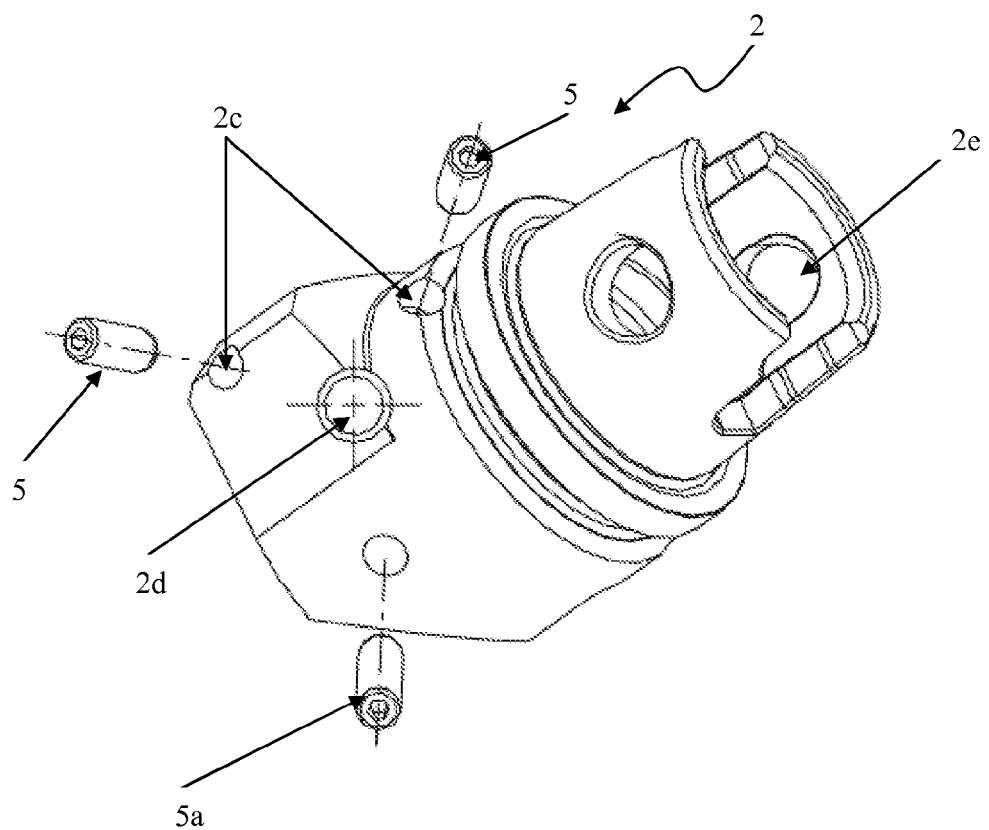
FIG. 6 shows an exploded view of holder in bottom perspective view to show pins and their respective holes according to the disclosure.

FIGS. 4a and 4b illustrates perspective and sectional views respectively of the head assembly (3) showing the hole (3b) at the bottom according to the disclosure. Also, a section taken along axis B-B illustrates that base of the head assembly (3) is in spherical shape to match with the cutout (2b) of the holder (2). Also, FIG. 6 illustrates an exploded view of holder (2) in bottom perspective view to show pins (5) and their respective holes (2c) according to the disclosure. The connecting means (2e) provided at other end of the holder (2) opposite to that of operating end where the cutting insert (6) is located is connected to a machine for operation of the cutting unit (1).

FIG. 5 illustrates exploded view of the head assembly (3) showing a ball bolt (4a) of the fastening means (4) comprising threaded rod to connect with a ball screw (4b). The ball bolt (4a) is passed through the hole (3b) for fastening and clamping the head assembly (3) with the holder (2).

Figure 7:
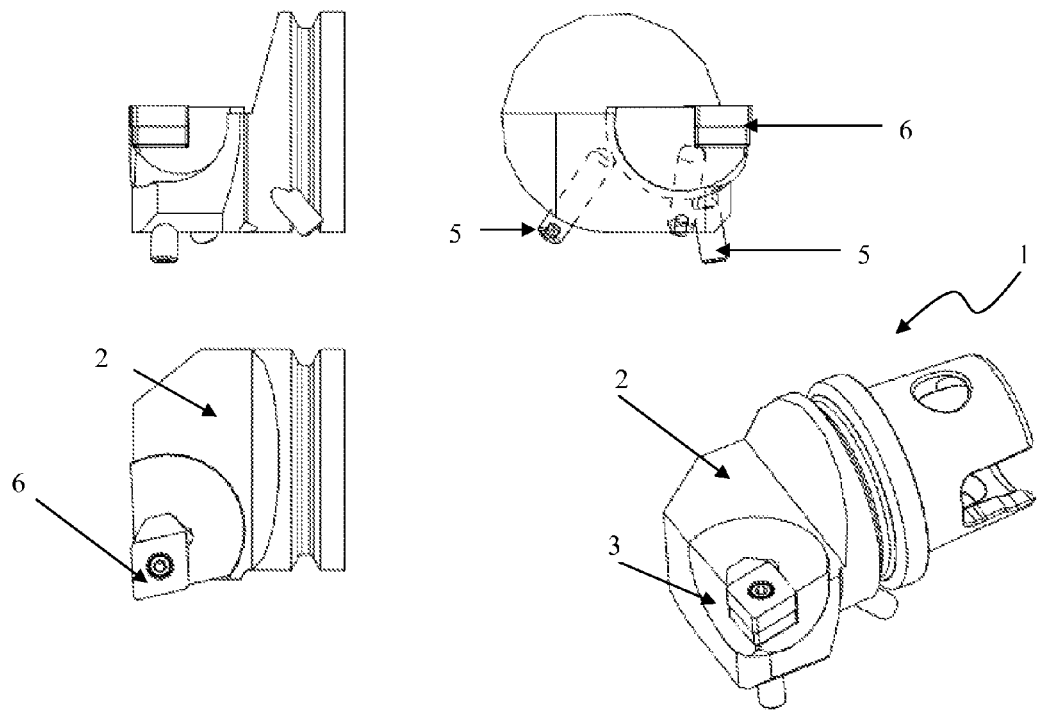
FIG. 7 shows a set of views of the cutting unit at zero rake angle according to the disclosure.

FIG. 7 illustrates a set of various views of the cutting unit (1) at zero rake angle according to the disclosure. The head assembly (3) is fixed onto the cutout (2b) of the holder (2). The surface of the head assembly (3) matches with the cutout (2b) surface and there is no gap in between the head assembly (3) and the holder (2). Thus the initial state of the cutting unit (1) is set for zero rake angle. During this time, the pins (5) are not making contact with the head assembly (3), instead there will be surface to surface contact between the holder (2) and the head assembly (3).

Figure 8:
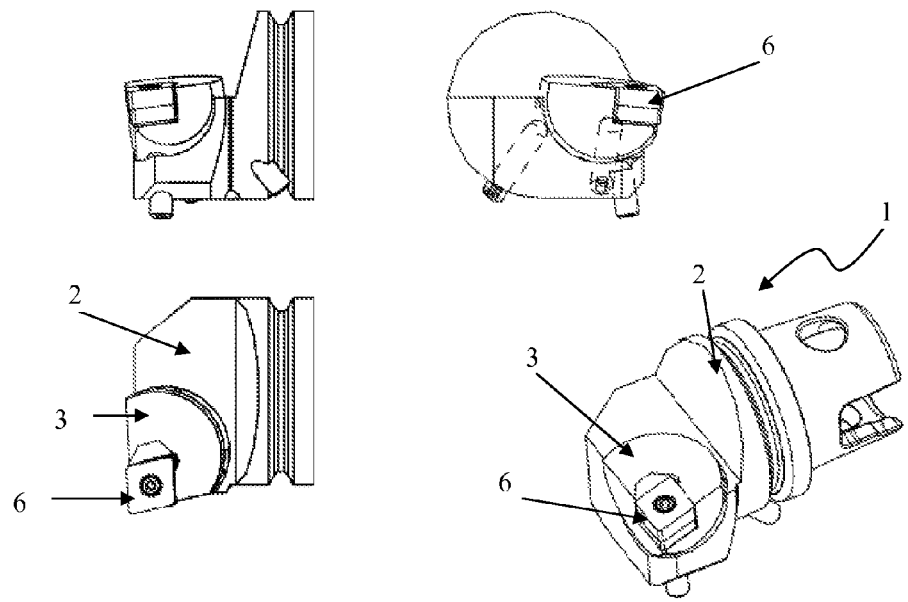
FIG. 8 shows a set of views of the cutting unit at altered rake angle and approach angle setting according to the disclosure.
Figure 9:
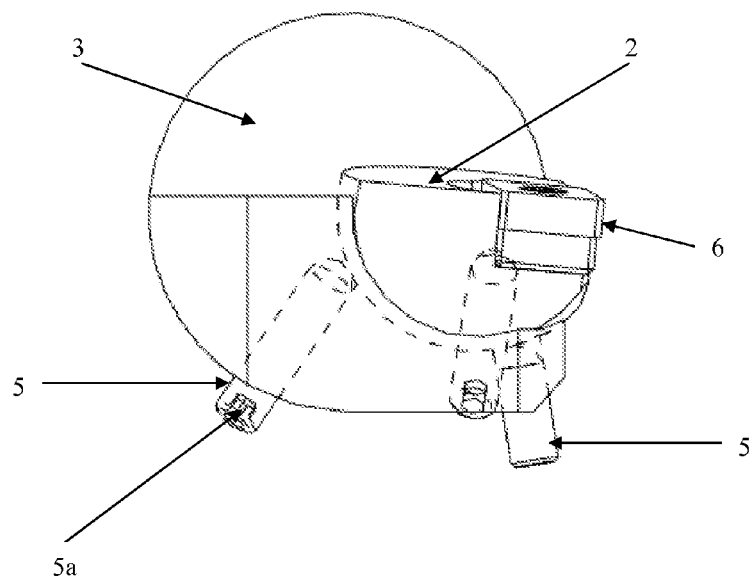
FIG. 9 shows view of the cutting unit to illustrate point contact between the pins and the head assembly according to the disclosure.

FIG. 8 illustrates a set of views of the cutting unit (1) at altered rake angle and approach angle setting according to the disclosure. The FIG. 9 also illustrates that the cutting unit (1) making point contact between the pins (5) and the head assembly (3). Three guide pins (5) have smooth finish surface up to certain length and threaded surface to certain predetermined length. A hexagon slot (5a) is also provided at bottom side for all three pins (5) which is used to give the movement inside the threaded holes (2c). The bottom spherical surface of the head assembly (3) makes contact with the cutout (2b) spherical surface of the holder (2). The inward and outward movement of the pins (5) gives up and down movement to the head assembly (3) with respect to the holder (2) to vary the rake angle. The movement of pins (5) can be manually made using the hexagonal slot (5a).

Figure 10:
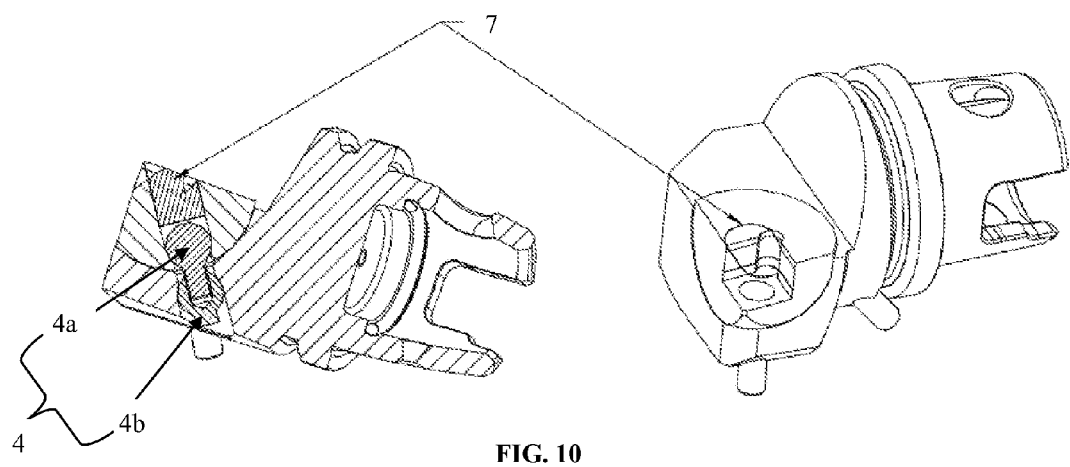
FIG. 10 shows a set of view to illustrate clamping ball and a pocket pin in the cutting unit according to the disclosure.

FIG. 10 illustrates a set of view to illustrate fastening means (4) comprising ball bolt (4a), ball screw and a pocket pin (7) in the cutting unit (1) according to the disclosure. The head assembly (3) is firmly clamped against the holder (2) using a clamping ball mechanism. The pocket pin (7) is provided at the hole (3b) of the head assembly (3) to provide the support to the cutting insert (6) placed onto the insert pocket (3a). The pocket pin (7) is fixed using a process such as welding or brazing. The ball bolt (4a) is threaded into head of the ball screw (4b) having a threaded head. Thus the connectivity between the ball bolt (4a) and the ball screw (4b) enables the clamping of the head assembly (3) with the holder (2). The angular movements of the head assembly (3) with respect to the holder (2) are taken care by the spherical heads of the ball bolt (4a) and the ball screw (4b).

Figure 11:
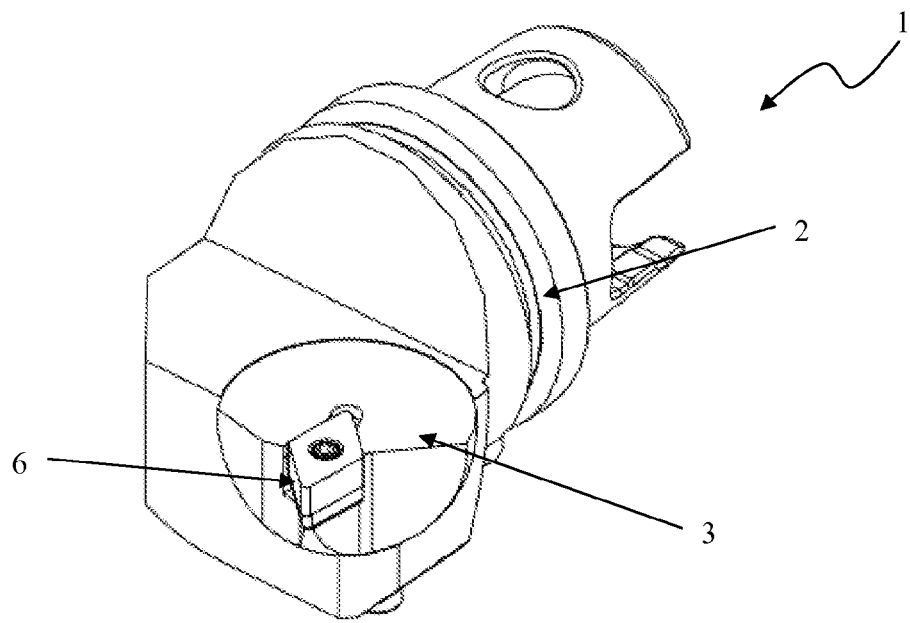
FIGS. 11 and 12 shows cutting unit with various cutting inserts.
Figure 12:
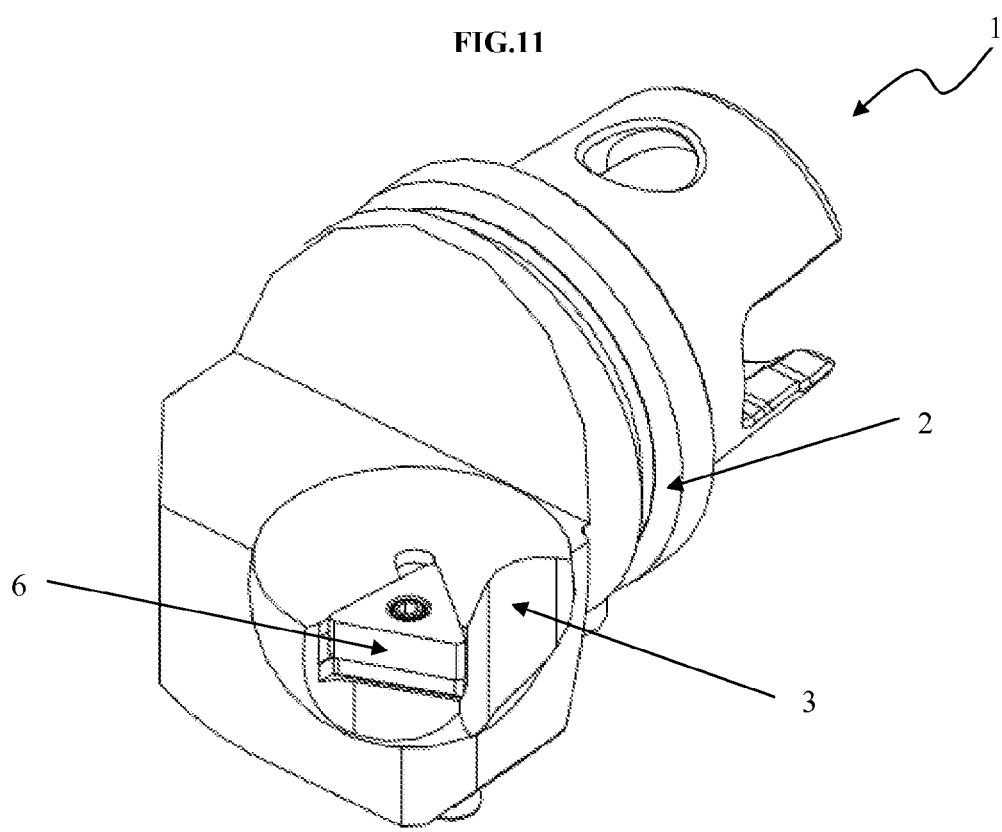

FIGS. 11 and 12 illustrates cutting unit with various cutting inserts. The head assembly is configured with inserts pocket which accommodates various types of cutting inserts.

Applications and Advantages

A certain range of rakes can be altered, which is not possible in regular cutting units.

A certain range of negative, positive and zero rakes can be set depending on the material, cutting force and finishing required. Positive and negative rakes up to 12 degrees can be achieved depending on the size of the cutting unit.

Any number of insert assembly head can be used on a single holder and hence, reducing operating cost for the customer.

The cutting unit is used in processes such as Turning, Facing, Grooving, Profiling, intermittent cutting, boring etc.

Equivalents

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A cutting unit comprising:
    a holder comprising a supporting block including a cut out at one end in one face; and a plurality of through holes at predetermined places on the cut out;
    a head assembly connected to said block, conforming to a shape of said cut out, said head assembly comprising an insert pocket to accommodate a cutting insert, and a through hole at its center for connecting with the holder;
    fastening means passing through the holes of the supporting block and head assembly; and
    a plurality of pins passing through the holes of the holder, wherein a position of said pins is varied to displace the head assembly to vary a rake angle of the cutting unit, and
    wherein the fastening means comprises a ball bolt comprising a threaded rod connected with a ball screw comprising a threaded ball head and a hexagonal protrusion.

2. A cutting unit comprising:
    a holder comprising a supporting block including a cut out at one end in one face; and a plurality of through holes at predetermined places on the cut out;
    a head assembly connected to said block, conforming to shape of said cut out, said head assembly comprising an insert pocket to accommodate a cutting insert, and a through hole at its center for connecting with the holder;
    fastening means passing through the holes of the supporting block and head assembly; and
    a plurality of pins passing through the holes of the holder, wherein a position of said pins is varied to displace the head assembly to vary a rake angle of the cutting unit,
    wherein the supporting block comprises one or more threaded holes for guiding the pins and wherein axes of the pins meet at one point.

3. A cutting unit comprising:
    a holder comprising a supporting block including a cut out at one end in one face; and a plurality of through holes at predetermined places on the cut out;
    a head assembly connected to said block, conforming to a shape of said cut out, said head assembly comprising an insert pocket to accommodate a cutting insert, and a through hole at its center for connecting with the holder;
    fastening means passing through the holes of the supporting block and head assembly; and
    a plurality of pins passing through the holes of the holder, wherein a position of said pins is varied to displace the head assembly to vary a rake angle of the cutting unit,
    wherein the pins are threaded for predetermined length and have spherical face at an end contacting the head assembly and have hexagon slot at bottom to provide movement inside the threaded holes.

4. A cutting unit comprising:
    a holder comprising a supporting block including a cut out at one end in one face; and a plurality of through holes at predetermined places on the cut out;
    a head assembly connected to said block, conforming to a shape of said cut out, said head assembly comprising an insert pocket to accommodate a cutting insert, and a through hole at its center for connecting with the holder;
    fastening means passing through the holes of the supporting block and head assembly; and
    a plurality of pins passing through the holes of the holder, wherein a position of said pins is varied to displace the head assembly to vary a rake angle of the cutting unit, wherein the cut out is in shape of segment of a sphere.

5. A cutting unit comprising:
a holder comprising a supporting block including a cut out at one end in one face; and a plurality of through holes at predetermined places on the cut out;
a head assembly connected to said block, conforming to a shape of said cut out, said head assembly comprising an insert pocket to accommodate a cutting insert, and a through hole at its center for connecting with the holder;
fastening means passing through the holes of the supporting block and head assembly; and
a plurality of pins passing through the holes of the holder, wherein a position of said pins is varied to displace the head assembly to vary a rake angle of the cutting unit,
wherein the hole in the head assembly is fitted with a pocket pin for filling a gap created on the head assembly by the hole and to support the cutting insert.

6. A method of varying a rake angle of a cutting unit, said cutting unit comprising a holder comprising a supporting block including a cut out at one end in one face; and a plurality of through holes at predetermined places on the cut out; a head assembly connected to said block, conforming to a shape of said cut out, said head assembly comprising an insert pocket to accommodate a cutting insert, a spherical bottom surface and a through hole at its center for connecting with the holder; fastening means passing through the holes of the supporting block and head assembly; and a plurality of pins passing through the holes of the holder, said method comprising steps of:
varying a position of pins projecting into the threaded holes to a predetermined length; and
clamping the fastening means to set a rake angle of the cutting unit,
wherein the pins make point contact with the spherical bottom surface of the head assembly to vary the rake angle of the cutting unit.

7. A method of assembling a cutting unit comprising:
mounting a cutting insert onto an insert pocket of a head assembly;
mounting the head assembly onto a supporting block of a holder at one end in one face;
connecting the head assembly to the supporting block using a fastening means passing through a hole of the supporting block; and
passing a plurality of pins through holes of the holder,
wherein a pocket pin is fitted into a hole of the head assembly by a predetermined process, and
wherein the fastening means comprises a ball bolt comprising a threaded rod connected with a ball screw comprising a threaded ball head and a hexagonal protrusion.

* * * * *